United States Patent
Comer et al.

(10) Patent No.: US 6,823,185 B1
(45) Date of Patent: *Nov. 23, 2004

(54) SYSTEMS AND METHODS FOR PERFORMING AUTHORIZED INTERCEPT IN A SATELLITE-BASED COMMUNICATIONS SYSTEM

(75) Inventors: Erwin Perry Comer, Queen Creek, AZ (US); William Henry Ruppert, Scottsdale, AZ (US); Pamela Tam Carmony, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 880 days.

This patent is subject to a terminal disclaimer.

(21) Appl. No.: 09/596,567

(22) Filed: Jun. 19, 2000

(51) Int. Cl.[7] ................................................ H04Q 7/20
(52) U.S. Cl. .................... 455/427; 428/430; 428/435.1; 428/433; 428/456.1; 379/35; 379/7; 379/213.01
(58) Field of Search ................................ 455/427, 428, 455/430, 433, 435.1, 405, 410, 12.1, 426, 422, 560, 412–414, 13.1; 379/7, 35, 213.01

(56) References Cited

U.S. PATENT DOCUMENTS

| | | | |
|---|---|---|---|
| 5,428,667 A | * | 6/1995 | Easterling et al. .......... 455/410 |
| 5,710,971 A | * | 1/1998 | Armbruster et al. ....... 455/12.1 |
| 5,930,698 A | * | 7/1999 | Bertacchi ..................... 455/405 |
| 5,937,345 A | * | 8/1999 | McGowan et al. .......... 455/410 |
| 5,946,618 A | * | 8/1999 | Agre et al. .................. 455/428 |
| 6,122,499 A | * | 9/2000 | Magnusson ................. 455/405 |
| 6,131,032 A | * | 10/2000 | Patel .......................... 455/445 |
| 6,141,548 A | * | 10/2000 | Blanchard et al. .......... 455/428 |
| 6,424,701 B1 | * | 7/2002 | Maillet et al. ................ 379/35 |
| 6,470,447 B1 | * | 10/2002 | Lambert et al. ............ 713/151 |
| 6,577,865 B2 | * | 6/2003 | Dikmen et al. ............. 455/433 |
| 6,738,902 B1 | * | 5/2004 | Ruppert et al. ............. 455/427 |

* cited by examiner

*Primary Examiner*—William Trost
*Assistant Examiner*—Joseph Nguyen
(74) *Attorney, Agent, or Firm*—Sharon K. Coleman

(57) ABSTRACT

Authorized intercepts of communications in a satellite communications system (10) are performed, according to which a law enforcement agency (LEA) can request the intercept of communications to and/or from subscriber units (SUs). In one embodiment, an LEA intercept request causes an intercept order for a particular target SU (420, FIG. 6) to be transmitted to one or more satellites (411–413, FIG. 6), where the intercept order is stored in an intercept table (410). Any communications traffic involving the target SU results in an intercept by a satellite, which routes a copy of the intercepted communications to the requesting LEA, either directly or via an associated intercept facility (426, FIG. 8).

20 Claims, 8 Drawing Sheets

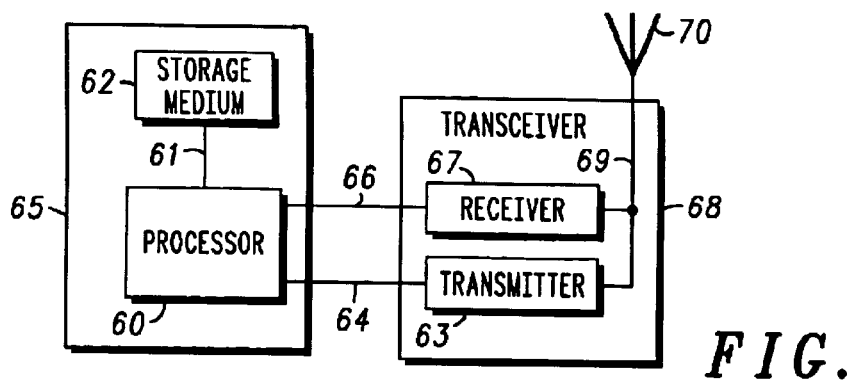
*FIG. 4*
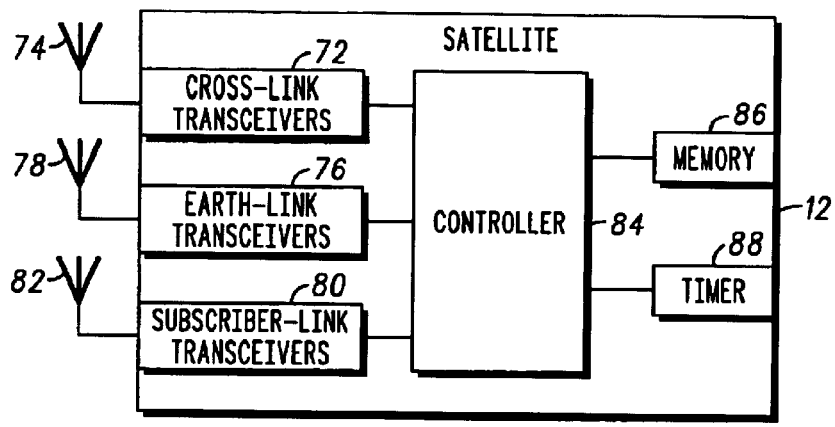
*FIG. 5*
*FIG. 6*
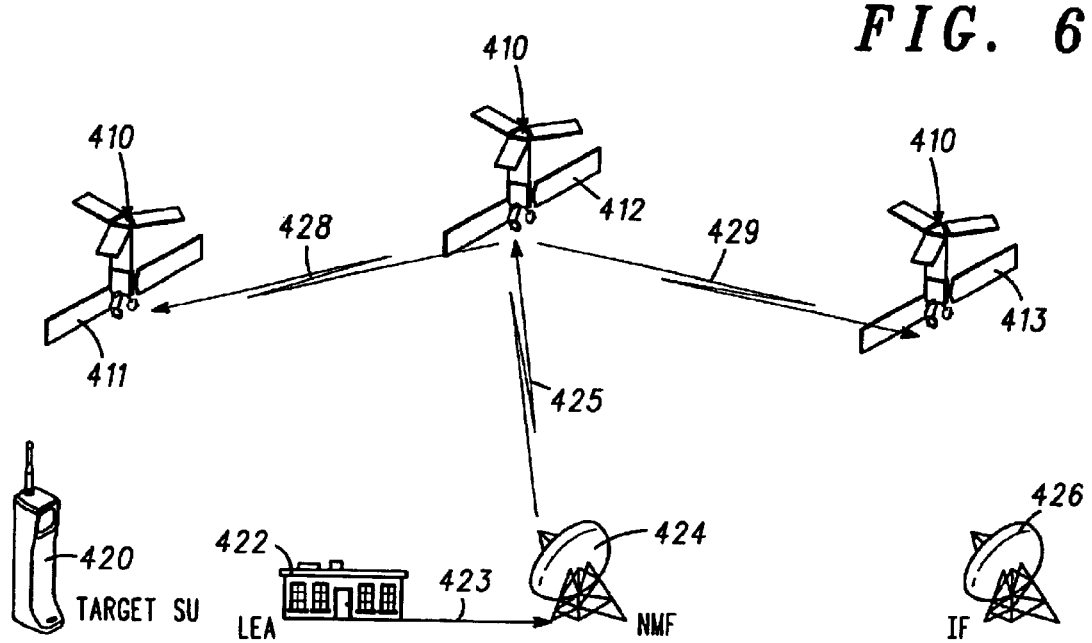

| 500 | INTERCEPT TABLE ONBOARD SATELLITE | | | | | | | |
|---|---|---|---|---|---|---|---|---|
| 501 | INTERCEPT ORDER NUMBER | TARGET SU ID | REQUESTING IF | START INTERCEPT | STOP INTERCEPT | DATA | HEADER | LEA |
| 502 | 00001 | 10002 | 007 | 2111260 | 2151260 | 1 | 0 | 001 |
| | 00002 | 25511 | 002 | 2112444 | 2161309 | 0 | 1 | 014 |
| 503 | 00003 | 64222 | 007 | 2113429 | 2174444 | 1 | 1 | 002 |
| 504 | NNNNN | | | | | | | |

| 600 | INTERCEPT ORDER PARAMETER TABLE AT INTERCEPT FACILITY | | | | | | | |
|---|---|---|---|---|---|---|---|---|
| 601 | INTERCEPT ORDER | TARGET SU | REQUESTING IF | START INTERCEPT | STOP INTERCEPT | DATA | HEADER | LEA |
| 602 | 00001 | 10002 | 007 | 2111260 | 2151260 | 1 | 0 | 001 |
| | 00003 | 64222 | 007 | 2113429 | 2174444 | 1 | 1 | 002 |

SYSTEMS AND METHODS FOR PERFORMING AUTHORIZED INTERCEPT IN A SATELLITE-BASED COMMUNICATIONS SYSTEM

RELATED INVENTIONS

The present invention is related to the following inventions which are assigned to the same assignee as the present invention:

U.S. Pat No. 5,710,971 issued Jan. 20, 1998; and

U.S. patent application Ser. No. 09/596,567, filed Jun. 19, 2000, entitled "Systems and Methods for Controlling Authorized Intercept in a Satellite-Based Communications Network."

FIELD OF THE INVENTION

This invention relates generally to communications systems and, in particular, to systems and methods for performing authorized intercept of communications within a communications system.

BACKGROUND OF THE INVENTION

Many countries in which communications networks, such as but not limited to telecommunications networks, operate have communications interception or wiretap laws. Such laws require communications service providers to enable legal entities to intercept specified communications taking place within their jurisdiction.

In the case of satellite-based communications systems, it is particularly challenging for a law enforcement agency (LEA) to intercept communications with a particular intercept target within its jurisdiction, because the target subscriber could be anywhere in the world, and because communications with such subscriber can be conducted through one satellite or a network of satellites without going through any land-based telephone office, such as a public switched telephone network (PSTN) station or a cellular telephone base station, which heretofore have conveniently provided authorized intercept capability to LEAs.

Accordingly, there is a significant need for systems and methods that can perform authorized intercepts within a satellite-based communications system.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 4 illustrates a simplified block diagram of an earth-based radio communication station suitable for use in one embodiment of the present invention;

FIG. 5 illustrates a simplified block diagram of a satellite-based radio communication station suitable for use in one embodiment of the present invention;

FIG. 6 illustrates an LEA intercept request generating an intercept order for storage in an intercept table on-board one or more satellites, according to one embodiment of the invention;

DETAILED DESCRIPTION OF THE DRAWINGS

Figure 1:
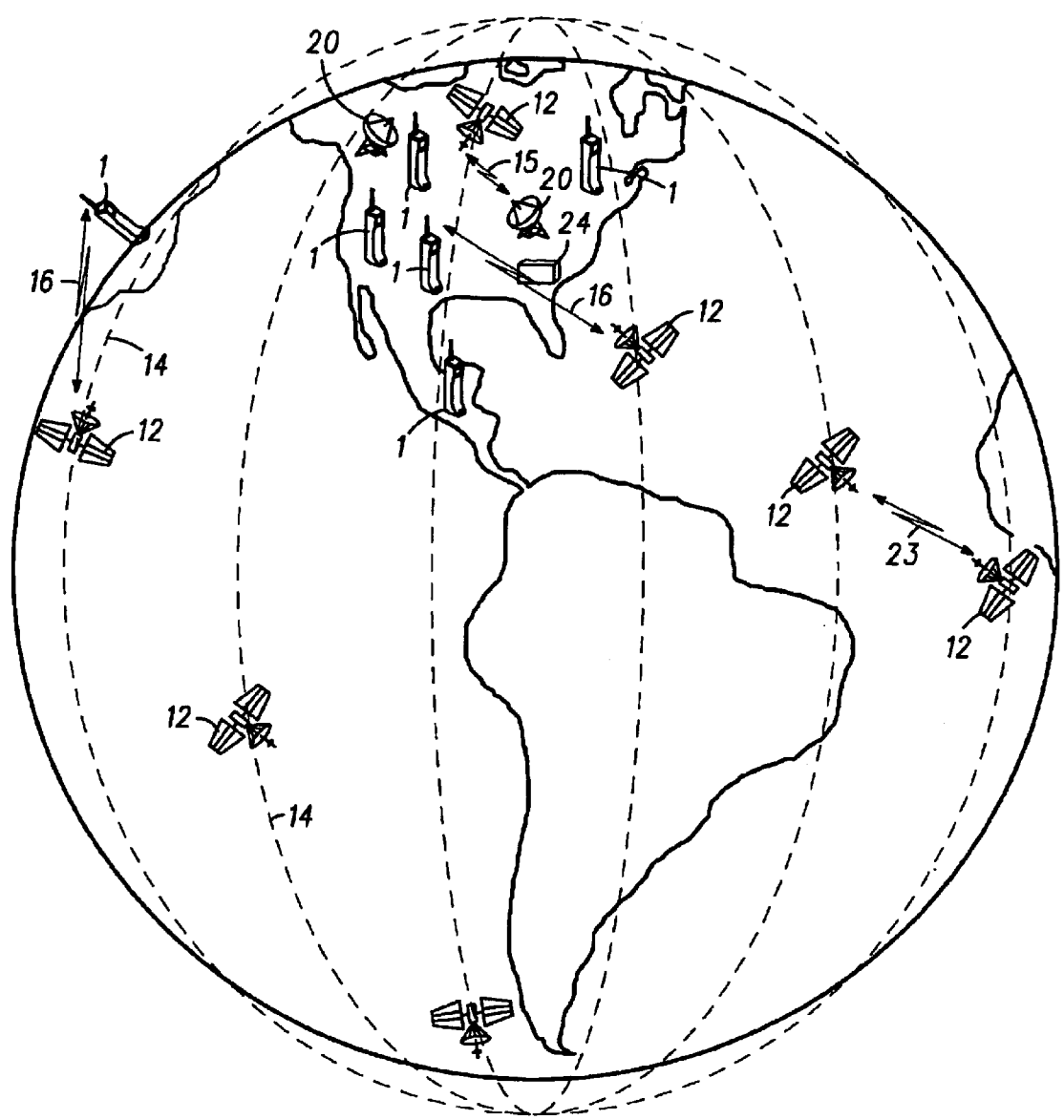
FIG. 1 depicts a simplified diagram of a satellite-based communications system with which the present invention may be practiced.

FIG. 1 illustrates a simplified diagram of a satellite-based communications system with which the present invention may be practiced. Although the present invention can be used with any satellite-based communications system, the invention will be described as implemented in a commercial satellite-based communications system. A "satellite" is defined herein to mean a man-made object or vehicle intended to orbit a cellestial body such as Earth, and includes both geostationary and orbiting satellites and/or combinations thereof including Low Earth Orbiting (LEO) satellites.

There are a number of commercial satellite-based communications systems. Most or all of them have many common system characteristics. For example, each satellite system has a number of earth stations called "gateways" located at various parts of the world. A gateway can be used for connecting or establishing a communication between a subscriber unit (SU) and a land-based telephone line, or a communication between two SUs. When the communication is directly between two SUs, the gateway connections that were made to set up the communications link are cut-away after a series of initial connections that were needed to set up the communication. Such a series of connections may include at least a connection through a network of satellites. Once the gateway connection is cut-away, the two SUs communicate directly through the network of satellites, or they may communicate through the network of satellites and a "visiting" gateway other than the gateway that has set up the communication.

An overview of the operation and components of one such satellite-based communications system will now be described with reference to FIG. 1.

Communications system 10 comprises a plurality of satellites 12 moving in a number of polar orbits 14, with each orbit 14 holding several satellites 12. The present invention can be used with a large number of satellites or with a single satellite. For clarity, FIG. 1 illustrates only a few of satellites 12.

For example, each orbit 14 encircles Earth at a relatively low altitude of several hundred kilometers. Due to the relatively low orbits of exemplary satellites 12, substantially line-of-sight wireless (e.g., radio, light, etc.) transmission from any one satellite 12 or reception of signals by any one satellite 12 involves or covers a relatively small area of Earth at any instant. For the example shown, satellites 12 travel with respect to Earth at around 25,000 km/hr, allowing satellite 12 to be visible to an SU or an earth station such as a gateway for a maximum period of circa nine 20 minutes.

The present invention is applicable to systems including satellites having low-Earth, medium-Earth and geosynchronous orbits. Additionally, it is applicable to orbits having any angle of inclination (e.g., polar, equatorial or other orbital pattern).

Satellites 12 communicate with radio communication subscriber units (SUs) 1 and with earth stations such as network management facility (NMF) 24 and one or more gateways 20. A "subscriber unit" (SU) is defined herein to mean any wireless communications device such as a cellular telephone, pager, personal digital assistant, computer, radio, selective communication device, transponder, telemetry device, or the like. Other facilities (not shown in FIG. 1) can be employed in the system, such as network management facilities UNFs); intercept facilities (IFs); network operations facilities (NOFs); telemetry, tracking, and control (TTAC) facilities; and the like. Alternatively, the functions provided by some or all of these facilities can be combined. A "facility" is defined herein to mean a structural, operational, organizational, and/or logical entity for performing one or more functions, and it need not be located on the Earth.

SUs 1 can be located anywhere on the surface of the Earth or in the atmosphere above the Earth. In one embodiment, SUs 1 are communications devices capable of transmitting data to and receiving data from satellites 12. By way of example, SUs 1 can be hand-held, portable cellular telephones adapted to communicate with satellites 12. Ordinarily, SUs 1 need not perform any substantial control functions for communications system 10.

System 10 can accommodate any number, potentially in the millions, of SUs 1. In one embodiment of the present invention, SUs 1 communicate with nearby satellites 12 via subscriber links 16. Subscriber links 16 encompass a limited portion of the electromagnetic spectrum that is divided into numerous channels. Subscriber links 16 can encompass Frequency Division Multiple Access (FDMA), Time Division Multiple Access (TDMA), Code Division Multiple Access (CDMA), or other channel D) diversity schemes or combinations thereof.

In one embodiment, a satellite 12 continuously transmits over one or more broadcast channels. SUs 1 synchronize to broadcast channels and monitor broadcast channels to detect data messages which can be addressed to them. Broadcast channels can also contain status information regulating access to satellite 12. In one embodiment, this status information informs SUs 1 regarding access or denial of new subscribers to satellite 12. SUs 1 can transmit messages to satellites 12 over one or more acquisition channels. Broadcast channels and acquisition channels are not dedicated to any one SU 1 but are shared by all SUs 1 currently within view of a satellite 12.

SUs 1 that are turned on use an acquisition channel to periodically report their location via a nearby satellite 12 to the system 10. The location data can be stored, for example, in the SU's "home" gateway, in a network operations facility (22, FIG. 3), and/or in the system's NMF 24. Location data can take the form of geolocation data indicating the position coordinates relative to the surface of the Earth of every active SU 1 in system 10. Any suitable technique for determining location can be used and can be implemented in a known manner. The term "location" as used herein is not limited to geolocation and means location of any type, such as physical, geographical, organizational, and/or logical position of an entity, such as a subscriber unit, of a communications system.

Traffic channels are two-way channels that are assigned to particular SUs 1 by satellites 12 from time to time. In one embodiment of the present invention, a digital format is used to communicate data over certain traffic channels, and other traffic channels support voice communications. At least one traffic channel is assigned for each communication, and each traffic channel has sufficient bandwidth to support, as a minimum, a two-way voice conversation. Preferably, each satellite 12 supports up to a thousand or more traffic channels, so that each satellite 12 can simultaneously service a like number of independent communications.

Satellites 12 communicate with other nearby satellites 12 through crosslinks 23. Thus, a communication from an SU 1 located at any point on or near the surface of the Earth can be routed through the constellation of satellites 12 to within range of substantially any other point on the surface of the Earth. A "constellation" is defined herein to mean an ensemble of satellites arranged in orbits for providing wireless communications coverage of portion(s) or all of a cellestial body, such as the Earth. A constellation typically includes multiple rings (or planes) of satellites and can have equal numbers of satellites in each plane, although this is not essential. A communication can be routed down to an SU 1 on or near the surface of the earth from a satellite 12 using a subscriber link 16.

Alternatively, a communication can be routed down to or up from any of many gateways 20, of which FIG. 1 shows only two, through earth-links (also called "feeder links") 15. Gateways 20 are preferably distributed over the surface of the earth in accordance with geopolitical boundaries. In one embodiment, each satellite 12 can communicate with up to four gateways 20 and with over a thousand SUs 1 at any given instant.

Network management facility 24 monitors the health and status of system communication nodes (e.g., gateways 20 and satellites 12) and desirably manages operations of communications system 10.

Gateways 20 can perform communication processing functions in conjunction with satellites 12, or gateways 20 can exclusively handle communication processing and allocation of communication handling capacity within communications system 10. Diverse terrestrial-based communications systems, such as the PSTN, can access communications system 10 through gateways 20.

In the present invention, a special-purpose gateway called an "intercept facility" (IF) (e.g. IFs 201 and 202, FIG. 3) can be provided to enable law enforcement agencies (LEAs) to perform communications intercepts. An "intercept facility" may also be referred to as a "mediation function", because its operations include keeping intercept requests of LEAs separate and distinct. Alternatively, the functions of IFs can be provided within ordinary gateways 20 or within any other terrestrial facility of communications system 10, such as an NMF 24.

With the example constellation, at least one of satellites 12 is within view of virtually every point on Earth's surface at all times (i.e., virtually full coverage of the Earth's surface is obtained). Theoretically, any satellite 12 can be in direct or indirect data communication with any SU 1 or gateway 20 at any time by routing data through the constellation of satellites 12. Accordingly, communications system 10 can establish a plurality of communication paths for relaying information through the communications system 10, including through the constellation of satellites 12 between any two SUs 1, between NMF 24 and a gateway 20, between any two gateways 20, and between an SU 1 and a gateway 20.

Figure 2:
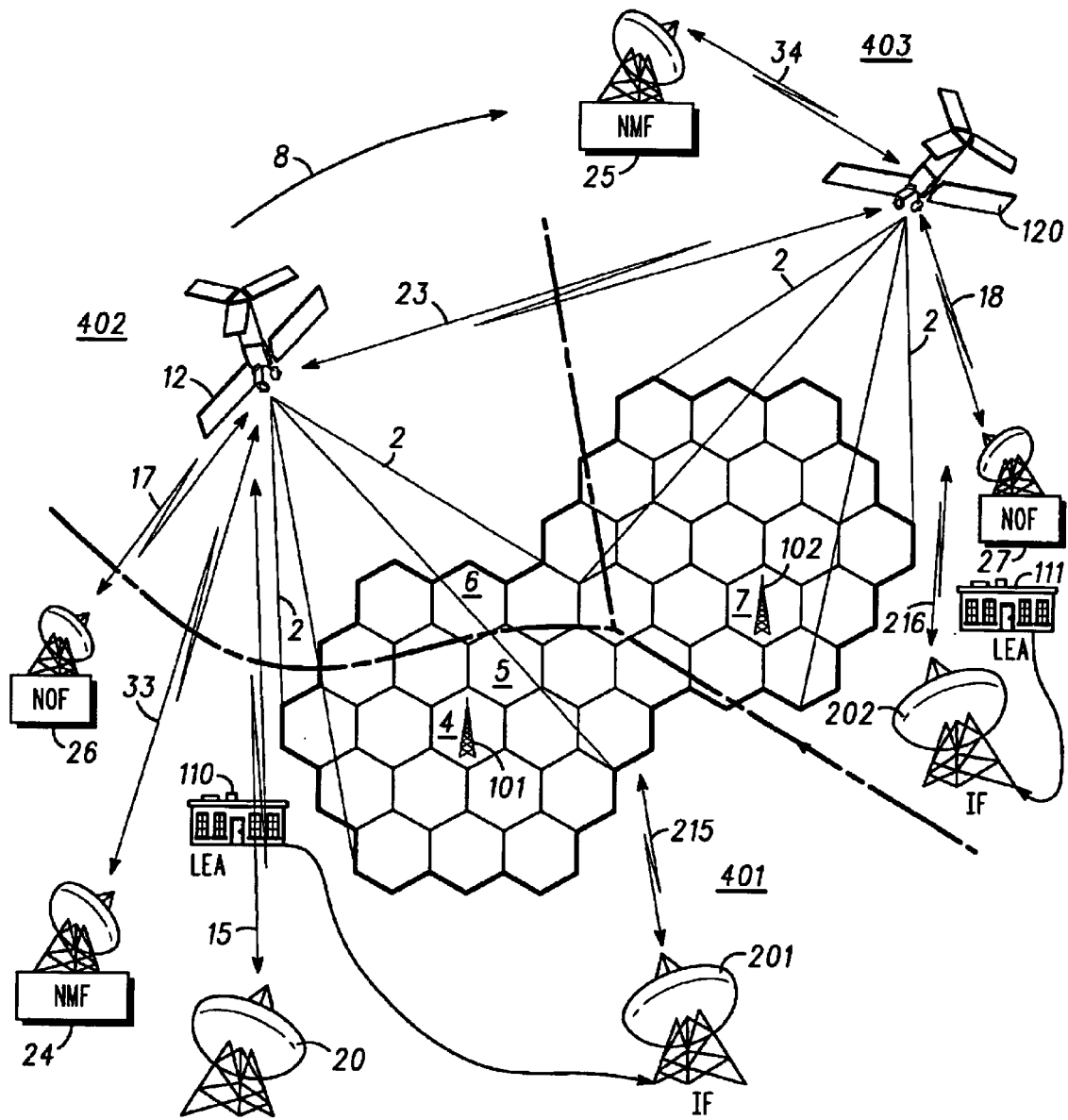
FIG. 2 depicts a more detailed diagram of a satellite-based cellular communications system with which the present invention may be practiced.

FIG. 2 depicts a more detailed diagram of a satellite-based cellular communications system with which the present invention may be practiced. As shown, the communications system comprises network operations facilities (NOFs) 26 and 27, network management facilities (NMFs) 24 and 25, gateway 20, specialized gateways called intercept facilities (IFs) 201 and 202, and multi-beam satellites 12 and 120.

NOFs 26 and 27 perform various operational functions to support communications system 10, including the generation and maintenance of a data structure 30 (FIG. 3) which includes SU IDs and information concerning the boundaries of jurisdictions, as described in greater detail below regarding FIG. 3. A "jurisdiction" is defined herein to mean a physical, hierarchical, organizational, or logical area over which an entity exercises authority. For example, a "jurisdiction" can be a geographical area that comprises all or a portion of a city, a country, or the earth. A "jurisdiction" can also be all or a portion of an organization, a demographic group, technology class (e.g. telephone subscribers, computer subscribers, pager subscribers, etc.), or any other defined category.

NOF 26 can communicate with a satellite 12 via an earth-link 17; similarly, NOF 27 can communicate with a satellite 120 via an earth-link 18. NOFs 26 and 27, like other earth stations, can also communicate both wirelessly and via wireline with terrestrial nodes (not shown) that can be part of communications system 10 or part of other communications systems (not shown).

NMFs 24 and 25 perform various management functions to support communications system 10, and they also can perform various intercept-related functions as will be described in greater detail below. NMF 24 can communicate with a satellite 12 via an earth-link 33; similarly, NMF 25 can communicate with a satellite 120 via an earth-link 34.

Satellites 12 and 120 project multi-beam antenna patterns 2, such as cell patterns 4–7, onto the face of the earth. Cell patterns 4 and 7 cover SUs 101 and 102, respectively. While only a single SU 101, 102 is shown in cell patterns 4 and 7, respectively, of the antenna patterns 2 of satellites 12 and 120, it will be understood that ordinarily many SUs will be covered by each cell pattern 4–7.

The terms "antenna pattern," "cell," "cell pattern," "communications," and "coverage area" as used herein are not intended to be limited to any particular mode of generation and include those created by either terrestrial or satellite communications systems and/or combinations thereof.

To initiate communications from, for example, SU 101 to SU 102, SU 101 inputs an addressing identification (ID), such as a phone number, for SU 102. A signal bearing SU 101's unique subscriber ID is relayed by the communications system 10 back to SU 101's home gateway, which may be in another part of the world from the gateway closest to SU 101. The home gateway shares SU 101's location data with other components of communications system 10, and these components can store the location data in appropriate computer-readable media.

The home gateway keeps information such as authentication and location for every one of its assigned subscribers. For example, when an SU initiates a communications connection, the satellite network relays the information to the home gateway of that SU for authentication. Once the authentication is approved by the home gateway, a list of gateways is communicated back. The gateways in the list are those visiting gateways that the SU may use to complete its communication, assuming that the SU is not located near its home gateway.

If the destination of the communication is a wireline SU connected to a PSTN at the home gateway, a new communication to the home gateway is set up for completing the communication to the wireline SU. If the destination of the communication is a land-based SU connected to a public switching network at a visiting gateway, a new communication is made to the visiting gateway. Also in a case, when the destination of the communication is another system SU, a new communication at a visiting gateway is set up. The communication is made through a series of link relays through the system satellite network to the location of the SU intended to receive the communication, or to the visiting gateway where a PSTN has a connection to the destination SU.

Information destined for another SU, such as SU 102, for example, is assembled at a gateway 20 and is transmitted with routing instructions. This packaged information is transmitted up to a nearby multi-beam satellite 12 via an earth-link 15 and, when necessary, through crosslink 23 to one or more adjacent a satellites 120, which can be in the same orbital plane or in an adjacent orbital plane (see FIG. 1), until the information reaches a satellite nearest the target SU, for example SU 102.

Satellite 120 determines from the routing instructions that a particular beam in its antenna pattern 2 should currently be used to communicate with SU 102. Satellite 120 then transmits the packet of information to SU 102. Two-way communications take place between the originating SU 101 and the destination SU 102, using the current servicing beams of satellites 12 and 120.

The satellite constellation is in continuous orbit, and satellites 12 and 120, as depicted in FIG. 2, are assumed to be in the same orbital plane and moving in the direction indicated by arrow 8. Servicing beams of satellite 120 move over the Earth's surface in the direction 8 of the satellites' orbital paths. Eventually, in a known manner which is not relevant to the present invention, communications between satellite 120 and SU 102 will be handed off from one servicing beam to another, and from satellite 120 to satellite 12. Likewise, cell-to-cell handoff and satellite-to-satellite handoff will occur with respect to SU 101.

Were it not for the fact that communications can be conducted through system directly between SUs or with an SU at a remote gateway, a law enforcement agency (LEA) 110 or 111 could conveniently establish a communications intercept or monitoring station at a local gateway 20 to monitor a communication through the local gateway 20.

However, because communications can occur directly between a first SU and a second SU or from a first SU to an SU coupled to a remote gateway through a terrestrial network such as a PSTN, the LEA cannot conveniently establish a communications intercept station at every gateway to monitor the communications originated or terminated at the first SU. Therefore, a local gateway is preferably where intercept can conveniently take place. A local gateway is a gateway close to the location of the SU originating or receiving the communication. However, it is not required that intercept take place in a local gateway, and it can take place in a distant gateway.

The area of the earth depicted by FIG. 2 depicts the intersection of three different jurisdictions identified by areas 401, 402, and 403. Areas 401–403 can be any type of jurisdiction, such as a city, county, state, region, country, or the like. A law enforcement agency (LEA) 110 is associated with jurisdiction 401, and another LEA 111 is associated with jurisdiction 403. LEAs can be of any size, ranging from a single person to a large group of people, and LEAs do not necessarily reside in or have to be associated with any type of building or structure. For example, an LEA can operate within an IF, such as IF 201 or IF 202. Alternatively, an IF can be part of an ordinary gateway 20. Each IF 201 and 202 can conduct communications with overhead satellites via communications links 215 and 216, respectively. Gateway 20 conducts communications with overhead satellites via a communications link 15.

While gateway 20 and IFs 201 and 202 are shown as having tracking antennas, they can utilize any other appropriate type of antennas such as omni-directional antennas, phased-array antennas, or the like.

Figure 3:
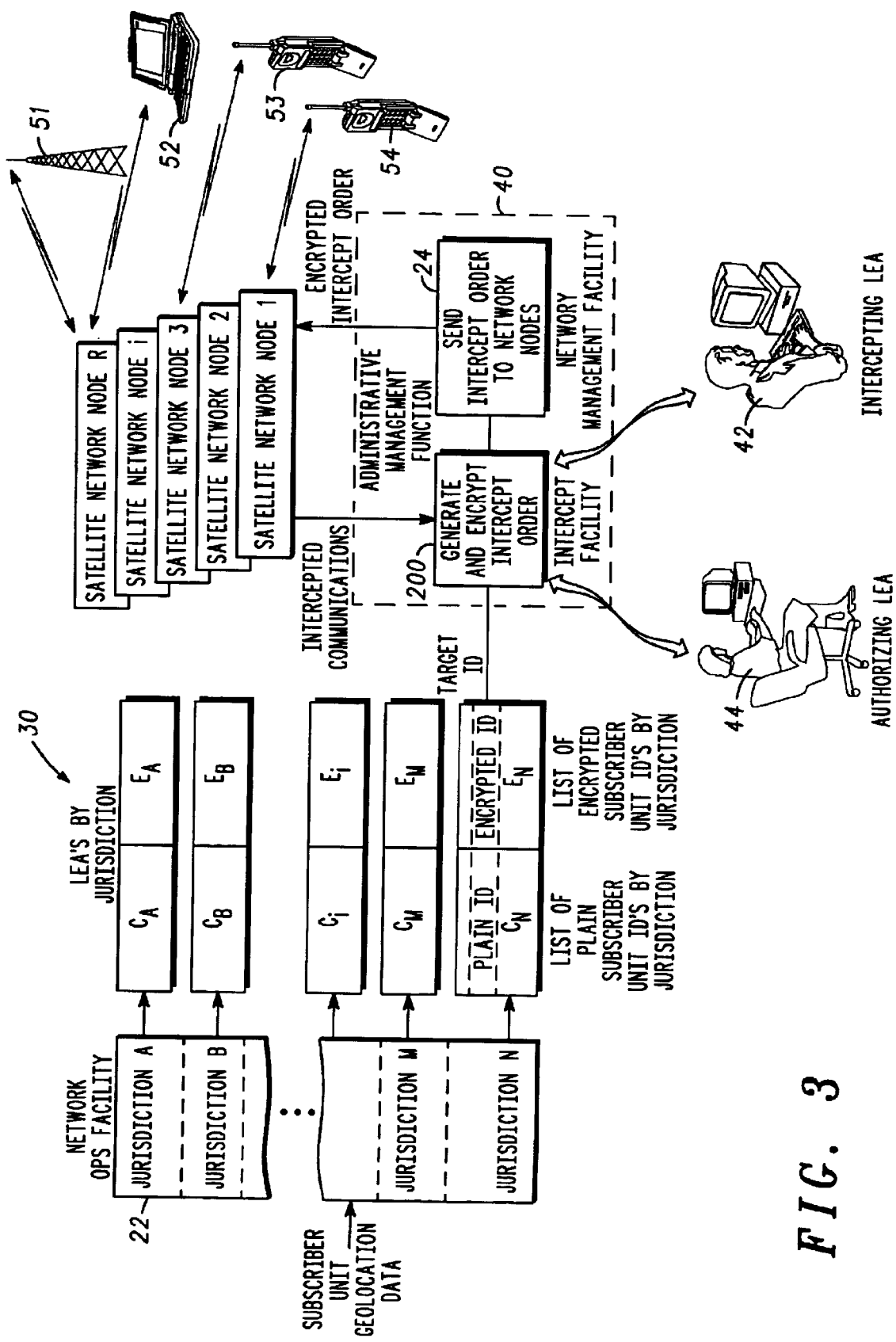
FIG. 3 illustrates a combined block diagram and flow diagram of a communications system and method that can perform authorized intercept, according to one embodiment of the invention.

FIG. 3 illustrates a combined block diagram and flow diagram of a communications system and method that can perform authorized intercept, according to one embodiment of the invention. Illustrated in FIG. 3 are exemplary elements of a communications system 10 that can be used to implement the invention.

A network operations facility (NOF) 22 maintains a data structure 30. In one embodiment, NOF 22 is a separate facility within communications system 10, but in other embodiments its function can be integrated into one or more other facilities, such as NMF 24 and/or IF 200. Data structure 30 includes a first portion that comprises a list of SU IDs appearing in unencrypted form. As shown in FIG. 3, the first portion comprises elements $C_A$ through $C_N$ of data structure 30. Element $C_A$ comprises a list of unencrypted (plain) SU IDs for Jurisdiction A, and so on, through element $C_N$, which comprises a list of unencrypted SU IDs for Jurisdiction N.

The terms "encrypted" and variants thereof such as "encrypt," as applied to LEO the processes of encryption and decryption, are used herein to mean that the authentication, confidentiality, and/or integrity of information can be assured.

Data structure 30 also includes a second portion that comprises a list of SU IDs appearing in encrypted form. As shown in FIG. 3, the second portion comprises elements $E_A$ through $E_N$ of data structure 30. Element $E_A$ comprises a list of encrypted SU IDs for Jurisdiction A, and so on, through element $E_N$, which comprises a list of encrypted SU IDs for Jurisdiction N.

Data structure 30 can also include a third portion that comprises location data for each SU. While the lists of plain and encrypted SU IDs illustrated in data structure of FIG. 3 are depicted as organized separately by jurisdiction, they in fact can be stored in any suitable manner, such as in a database in which each record comprises the unencrypted and encrypted forms of an SU ID as well as current location data for the SU.

NOF 22 receives and maintains SU location data according to known techniques. NOF 22 also stores data that defines the boundaries of all jurisdictions in the communications system 10, such as Jurisdictions A through N. Thus, the NOF knows both the location of all SUs in the communications system 10 as well as the boundaries of all jurisdictions covered by communications system 10.

Communications system 10 comprises one or more administrative management functions (AMFs) such as AMF 40. AMF 40 interfaces with LEAs (such as LEA 42) that may require interception in the communications system 10, keeping intercept activities of individual LEAs separate. AMF 40 also interfaces to one or more NOFs (such as NOF 22) for the reception of jurisdictional lists of SU IDs. AMF 40 also interfaces to network nodes (such as network nodes 1–R), for example by sending intercept orders to and receiving intercepted communications from the network nodes. Each AMF can comprise one or more IFs, such as IF 200, and one or more NMFs, such as NMF 24.

A network intercept facility 200 is used by LEAs to order communications intercepts. In one embodiment, IF 200 is a separate facility within communications system 10, but in other embodiments its function can be integrated into one or more other facilities, such as a gateway 20 (FIG. 1) and/or NMF 24. The IF 200 is ULs supplied with the lists of unencrypted and encrypted SU IDs, and the lists are continually updated as SUs are activated or as they move from one jurisdiction to another.

A person belonging to an LEA who desires to intercept communications to a particular SU can obtain permission from a court or other agency to carry out an intercept. The requesting person, or another member of the LEA, can then authorize and order the communications system 10 to carry out the intercept. In one embodiment, an authorizing LEA person 44 communicates an intercept request to IF 200 via an appropriate channel such as a wireline or wireless computer link or telephone link.

In response to receipt of an intercept request from authorizing LEA person 44, IF 200 selects the target SU ID (including both the plain and encrypted forms of the target SU ID), generates an intercept order including the encrypted SU ID, encrypts the intercept order, and transmits the encrypted intercept order to NMF 24.

NMF 24 sends encrypted intercept orders to one or more satellite communication nodes or network nodes 1–R. In one embodiment, NMF 24 is a separate facility within communications system 10, but in other embodiments its function can be integrated into one or more other facilities, such as an NOF 22, IF 200, and/or gateway 20 (FIG. 1).

An encrypted intercept order can be received by one or more satellite network nodes 1–R. In one embodiment, satellite network nodes 1–R are responsible for conducting communications directly with SUs that are located within their coverage area. For example, satellite network nodes 1 and 3 can be satellites in whose coverage areas SUs, such as satellite phones 54 and 53, respectively, are currently located. Satellite network node R can be a satellite from which it is convenient to conduct communications with a wireless computer 52 and with a wireless SU 51 of any type.

A satellite network node 1–R receiving an encrypted intercept order directed to an SU within its coverage area attempts to decrypt the encrypted intercept order, using a key which is known only to satellite network nodes 1–R (or a subset thereof) and to the IF 200 that generated and encrypted the encrypted intercept order. The satellite network node also attempts to decrypt the encrypted SU ID that is included in the encrypted intercept order, using a key that is known only to satellite network nodes 1–R (or a subset thereof) and to the NOF 22 that generated the lists of plain and encrypted SU IDs.

If successful in decrypting the encrypted intercept order and the encrypted SU ID of the target intercept SU, the particular satellite network node executes the communications intercept and directs intercepted communications back to the IF 200 or other entity that originated the intercept order. The IF 200 communicates the intercepted communications to an intercepting LEA person 42 via an appropriate link such as a wireline or wireless computer link or telephone link. Alternatively, the intercepted communications can be linked directly with an intercepting LEA person 42 without going through an IF 200. Intercepted communications can be transmitted either in encrypted or unencrypted form, depending upon the requirements of system users.

The particular structures and processes depicted in FIG. 3 are merely illustrative of one embodiment of the invention, and other implementations will be apparent to those of ordinary skill in the art. For example, as illustrated below regarding FIGS. 4 and 5, in one embodiment an LEA can make an intercept request directly to an NMF rather than via an IF.

FIG. 4 illustrates a simplified block diagram of an earth-based radio communication station suitable for use in one embodiment of the present invention. Several different types of earth stations can be provided to implement a communications system in which authorized intercepts can be performed, depending upon the system's functional and cost requirements. For example, earth stations can take the form of a network management facility (NMF) 24, a gateway 20, and a network intercept facility (IF) such as IF 201 or IF 202. Other types of earth stations can be employed in the system, such as network operations facilities (NOF 22, FIG. 3); telemetry, tracking, and control (TTAC) facilities (not shown); and the like. Alternatively, the functions provided by some or all of the earth stations can be combined in any suitable manner.

Earth stations can be differentiated by the various functions they perform. However, each earth station typically includes at a minimum the components shown in FIG. 4. Thus, an earth station comprises a data processing system 65 having at least one processor or processing element 50 coupled via a link 61 to a storage medium 62 (e.g., random access memory or RAM, other semiconductor or magnetic read-write memory devices, optical disk, magnetic tape, floppy disk, hard disk, etc.).

Storage medium 62 comprises a computer-readable medium that stores computer programs and data structures comprising variables, tables, and databases, that are executed, accessed, updated, and manipulated during the operation of communications system 10. With particular regard to the present invention, storage medium 62 stores data structures, such as data structure 30 of FIG. 3, wherein lists of SU IDs are organized and stored. The data structures include a list of SU IDs appearing in unencrypted form, and they also include the list of SU IDs appearing in encrypted form.

The data structures can be organized in any suitable way. In one embodiment, the data structures are organized into records, which indicate location data for each SU ID. Each SU ID is associated with a particular jurisdiction within which the corresponding SU resides, either in a physical or logical sense. For example, with reference to FIG. 2, SU 101 can be associated with jurisdiction 401, whereas SU 102 can be associated with jurisdiction 403.

The earth station also typically includes an earth terminal transceiver 68 that comprises an antenna 70 coupled to transmitter 63 and receiver 67 via link 69. Transmitter 63 and receiver 67 are coupled to processor 60 via links 64 and 66, respectively.

While in one embodiment processor 60 and storage medium 62 are contained within the earth terminal, this is not essential. The central processing functions and memory functions can be distributed or concentrated elsewhere in the system. For example, a master control station can be used, and some or all of the computing, management, and intercept functions described above can be concentrated therein. Alternatively, these functions can be distributed among various levels of the system in a hierarchical network, each level being responsible for computing, managing, and intercepting communications at its own level.

Processor 60 desirably carries out procedures exemplified herein and described in the associated text. For example, in addition to performing other tasks as appropriate, processor 60 desirably stores results from such procedures in storage medium 62. Transmitter 63 and/or receiver 67 transmit communications to and/or receive communications from satellites 12.

In addition to managing processes associated with SU IDs, processor 60 generally controls and manages subscriber access, message reception and transmission, the generation of intercept orders, channel set-up, radio tuning, channel assignment, and other communication and control functions not managed or provided for by controller 84 (FIG. 5).

FIG. 5 illustrates a simplified block diagram of a satellite-based radio communication station suitable for use in one embodiment of the present invention. Preferably, all satellites 12 within system 10 (see FIG. 1) include equipment as illustrated by the block diagram of FIG. 5. Satellite 12 includes crosslink transceivers 72 and associated antennas 74. Transceivers 72 and antennas 74 support crosslinks to other nearby satellites 12.

Earth-link transceivers 76 and associated antennas 78 support earth-links to communicate with earth stations such as NMF 24 (FIG. 1), IF 426 (FIG. 6), gateways 20, and other types of earth stations (not shown). SU transceivers 80 and associated antennas 82 support SUs 1 (FIG. 1). Preferably, each satellite 12 can simultaneously support a link for up to several thousand or more of SUs 1 (FIG. 1). Of course, those skilled in the art will appreciate that antennas 74, 78, and 82 can be implemented as single multidirectional antennas or as banks of discrete antennas. In one embodiment each subscriber link antenna 82 is a phased array antenna capable of accessing many cells simultaneously.

SU transceivers 80 are desirably multi-channel transceivers capable of transmitting and receiving on different channels, according to a suitable channel diversity scheme, such as Frequency Division Multiple Access (FDMA), Time Division Multiple Access (TDMA), Code Division Multiple Access (CDMA), or other channel diversity schemes or combinations thereof. SU transceivers 80 contain multi-channel radios having a sufficient number of channels to provide the desired number of transmission and reception channels for signal access and control, and for the subscriber communications. Controller 84 can provide for channel allocation, cell-to-cell hand-off, and other overhead, management, and control functions.

A controller 84 is coupled to each of transceivers 72, 76, and 80 as well as to a memory 86 and a timer 88. Controller 84 can be implemented using one or more processors or processing elements. Controller 84 uses timer 88 to maintain, among other things, the current date and time. Memory 86 comprises a computer-readable medium that stores computer programs and data structures comprising variables, tables, and databases, that are executed, accessed, updated, and manipulated during the operation of communications system 10. The computer programs, when executed by controller 84, cause satellite 12 to carry out certain of the communication intercept procedures, which are discussed herein.

For example, controller 84 of the satellite 12 (FIG. 3) that is providing communications to a particular intercept target SU can access a decryption key stored in memory 86 to decrypt an encrypted intercept order received from an entity within the communications system 10, such as from NMF 24. This key is known only to satellites 12 and to the IF 200 (FIG. 3) that encrypted it Thus, the servicing satellite 12 can be assured that the intercept order came from a trusted source, namely an IF. The key can either be distributed to all satellites 12 or to a subset of satellites 12, including just one satellite 12, depending upon the type of constellation.

Controller 84 can also access a decryption key stored in memory 86 to decrypt an encrypted SU ID received from an entity within the communications system 10, such as from NMF 24. This key is known only to satellites 12 and to the NOF 22 that encrypted it. Thus, the servicing satellite 12 can be assured that the SU ID is for an SU in a jurisdiction for which intercept is authorized.

It will be apparent to one of ordinary skill in the art how to design, construct, and operate the transceiver and data processing equipment of the satellite-based communications node in view of the disclosure herein.

The encryption of SU IDs and intercept orders will now be briefly described. The encryption and decryption functions can be implemented in any suitable way, for example by using a public key encryption algorithm such as RSA, Diffie-Hellman, Elliptic, and the like. The encrypted intercept order and the encrypted SU ID of the encrypted intercept order have one or more keys that assure the confidentiality, integrity, and/or authentication of the intercept order and the SU ID.

The term "confidentiality," as applied to the processes of encryption and decryption, is used herein to mean that only the intended recipient of encrypted information can read it.

The term "integrity," as applied to the processes of encryption and decryption, is used herein to mean that the intended recipient of encrypted information knows with assurance that it has not been modified.

The term "authentication," as applied to the processes of encryption and decryption, is used herein to, mean that the intended recipient of encrypted information knows with assurance who sent it.

Either symmetrical or asymmetrical encryption schemes can be used. In a symmetrical encryption scheme, for example, the encrypted intercept order is encrypted using a key that is known only to the NOF and to the network node, and the encrypted intercept order is encrypted using a key that is known only to the network node and to the LEA that originated the encrypted intercept order.

In an asymmetrical encryption scheme, the encrypting and decrypting entities use different keys. One entity can use, for example, a public key, and the other entity can use a private key. In one embodiment of the invention, encrypting is performed with a public key, and decryption is performed with a private key. The inverse can also be implemented, wherein encrypting is performed with a private key, and decryption is performed with a public key, for authentication and/or integrity purposes.

Figure 7:
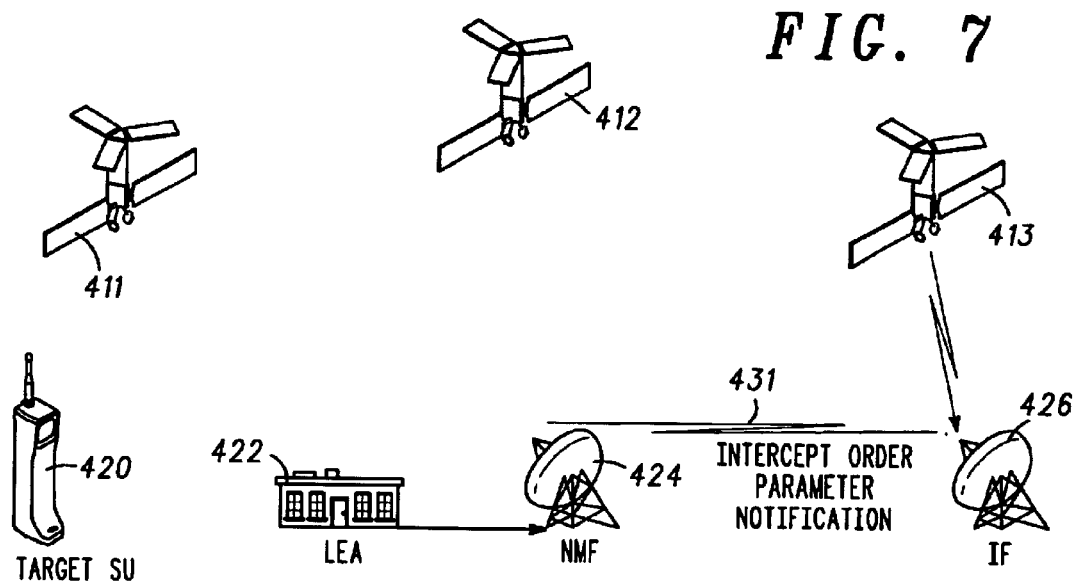
FIG. 7 illustrates an LEA intercept request generating an intercept order parameter notification to an IF, according to one embodiment of the invention.

FIG. 6 illustrates an LEA intercept request generating an intercept order for storage in an intercept table 410 on-board one or more satellites 411–413, according to one embodiment of the invention. An intercept request originating from a law enforcement official associated with LEA 422 causes an intercept order for a particular target SU, such as SU 420, to be transmitted via link 423 to NMF 424. NMF 424, in response to the intercept request, generates an intercept order that has at least two components, one of which is illustrated in FIG. 6, the second of which is illustrated in FIG. 7.

From NMF 424, one component of the intercept order is transmitted over link 425 to nearby satellite 412, wherein the intercept order is stored in an intercept table on-board satellite 412. The intercept order can also be transmitted by satellite 412 to other satellites in the communications system, such as via links 428 and 429 to satellites 411 and 413, respectively. Alternatively, the intercept order can be sent to other satellites directly from one or more terrestrial stations.

The intercept request and the intercept order are typically encrypted to ensure the confidentiality, integrity, and/or authentication of the intercept request and the intercept order, including the identity of the target SU, the requesting LEA, and the associated IF. However, it is not essential for the present invention to employ encryption over any communications link.

Any or all of the satellites in the communications system can have an intercept table and can store intercept orders therein. In one embodiment, an identical intercept table 410 is maintained in every satellite of the communications system. However, in other embodiments, all of the intercept tables need not contain the same information.

Figures 11, 12, 13:
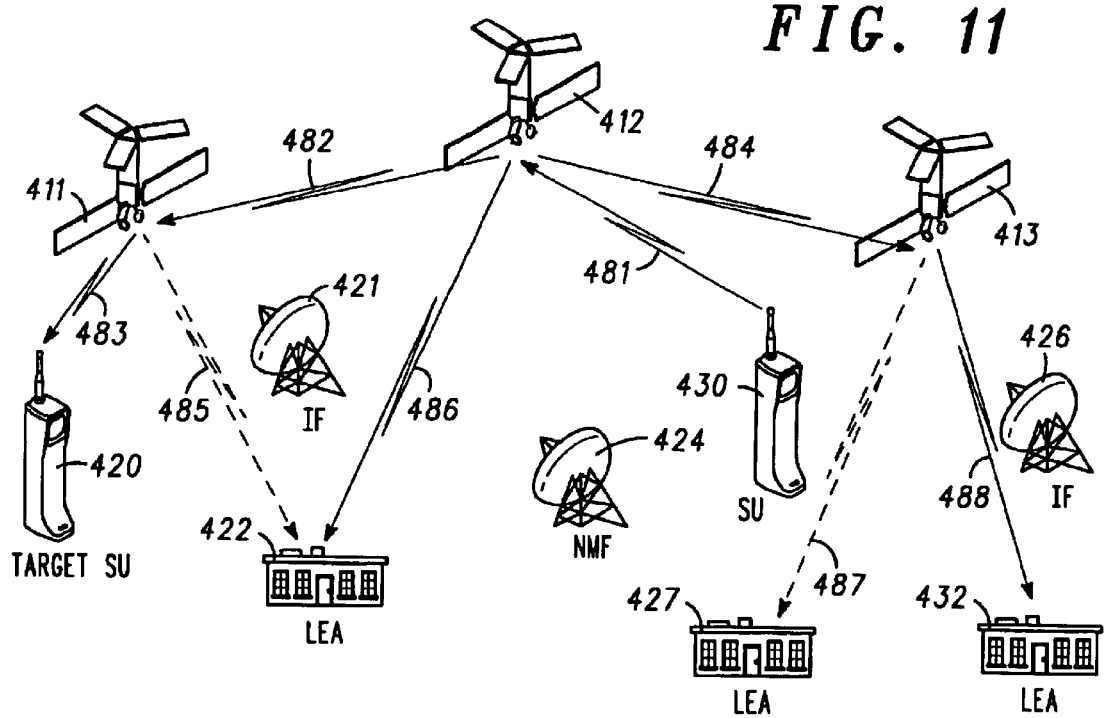
FIG. 11 illustrates a communications intercept when the target SU is the destination of the communications, and wherein the intercepting satellite broadcasts cloned communications directly to one or more LEAs, according to one embodiment of the invention.
FIG. 12 illustrates an intercept table that is maintained in one or more satellites, according to one embodiment of the invention.
FIG. 13 illustrates an intercept order parameter table that is maintained in one or more IFs, according to one embodiment of the invention.

An intercept table is illustrated in FIG. 12, which is discussed in detail below but, for present purposes of understanding, an intercept table contains a list comprising all active intercept orders, including the identities of all target SUs, the identities of IFs to which intercepted communications are to be directed, the start and stop times of the intercepts, and the identities of the requesting LEAs.

It is the responsibility of the satellites in the system to recognize all communications traffic that is originating from or destined to a target SU. To do so, each satellite that has an intercept table looks for traffic or traffic-related information containing a target SU ID. When it sees a target SU ID, it intercepts the traffic or traffic-related information that is tagged with that target SU ID. In performing the intercept, it transmits the original traffic to its intended destination while concurrently generating and transmitting a cloned version of the original traffic, which it transmits to another communications node within the system. The other communications node is specified by an IF ID in the intercept table entry corresponding to the particular target SU whose traffic is being intercepted.

FIG. 7 illustrates an LEA intercept request generating an intercept order parameter notification to an IF 426, according to one embodiment of the invention. From NWF 424 a second component of the intercept order, referred to as an intercept order parameter notification, is transmitted over link 431 to IF 426, which is an intercept facility that supports the intercept activities of LEA 422. While link 431 is shown as a terrestrial wireless link, it could also be a terrestrial wireline link or a wireless link through one or more satellite communications nodes.

The parameter notification is stored in an intercept order parameter table within IF 426. The intercept order can also be transmitted by NMF 424 to other IFs in the communications system via suitable communications links. Any or all of the IFs in the communications system can have an intercept order parameter table and can store intercept order parameter notifications therein. In one embodiment, an intercept order parameter table is maintained in every satellite of the communications system. Generally, the intercept order parameter tables do not contain the same information, because generally not all IFs within the system support the same LEAs. However, those IFs that support the same LEAs generally contain the same information.

An intercept order parameter table is illustrated in FIG. 13, which is discussed in detail below but, for present purposes of understanding, an intercept order parameter table contains a list comprising all active intercept orders for target SUs associated with the IF in which the particular table resides, including the identities of all target SUs associated with the IF, the identities of IFs to which intercepted communications are to be directed, the start and stop times of the intercepts, and the identities of the requesting LEAs.

It should be understood that more than one IF can be provided for a particular LEA; likewise, more than one LEA can be associated with a particular IF. The ratio of LEAs to IFs is a matter of design choice depending upon the system requirements.

It should also be understood that while some communications links illustrated in the drawings are shown as unidirectional to simplify the description, they are generally bi-directional.

Figure 8:
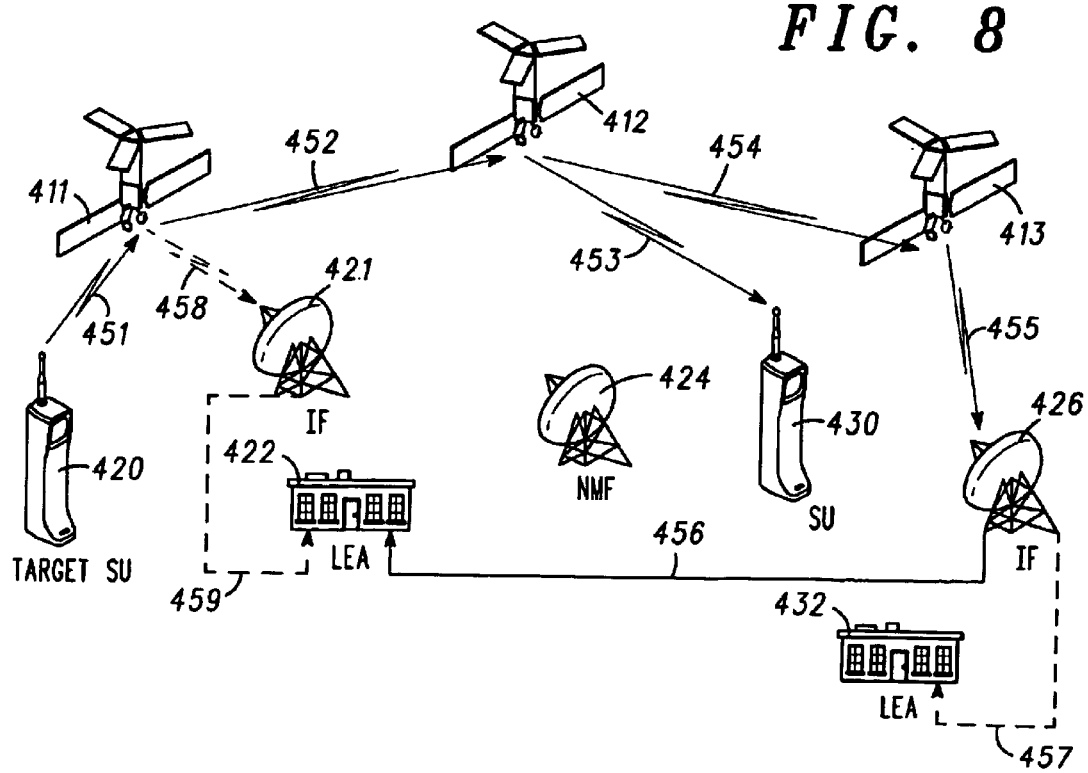
FIG. 8 illustrates a communications intercept when the target SU originates the communications, and wherein the intercepting satellite transmits cloned communications to an LEA via an IF, according to one embodiment of the invention.

FIG. 8 illustrates a communications intercept when the target SU originates the communications, and wherein the intercepting satellite transmits cloned communications to an LEA via an IF, according to one embodiment of the invention. For example, a target SU 420 is originating communications to another SU in the network, such as SU 430. Satellites 411 and 412, forming part of the communications link from target SU 420 to SU 430, each contain an intercept table identifying target SU 420 as an SU whose communications should be intercepted. So when communications traffic involving target SU 420 moves through satellites 411 and 412, they know to intercept it and to send a cloned copy of it to the IF associated with the LEA that requested the interception.

As shown in FIG. 8, communications traffic between target SU 420 and SU 430 can follow a path that includes links 451, 452, and 453. Either the first satellite receiving traffic from target SU 420, i.e. satellite 411, or another satellite in the system through which traffic from target SU 420 is moving, i.e. satellite 412, can perform the intercept. In one embodiment, illustrated in FIG. 8, the traffic from target SU 420 is intercepted by satellite 412. Satellite 412 clones the communications transmissions occurring between target SU 420 and SU 430. Satellite 412 transmits the original traffic occurring between target SU 420 and SU 430 via link 453, while satellite 412 concurrently transmits the cloned traffic via link 454 to satellite 413. Satellite 413, in turn, transmits the cloned traffic via link 455 to IF 426, as specified by the particular intercept table entry for target SU 420. From IF 426, a transmission of the clone of the intercepted communication is addressed and sent to the requesting LEA 422. This can be over any suitable link, such as terrestrial wireline 456, or via a wireless link that is preferably encrypted. As mentioned earlier, intercepted communications can be transmitted either in encrypted or unencrypted form, depending upon the requirements of system users.

One IF, such as IF 426, can provide intercepted traffic to more than one LEA, so that, for example, IF 426 can send intercepted traffic both over link 456 to LEA 422 and over link 457 to LEA 432.

In another embodiment, the traffic from target SU 420 is intercepted by satellite 411. Satellite 411 transmits the original traffic occurring between target SU 420 and SU 430 via links 451 and 452, while satellite 411 concurrently transmits the cloned traffic via link 458 to IF 421, as specified by the particular intercept table entry for target SU 420. From IF 421, the cloned traffic is made available to a requesting LEA, such as LEA 422. This can be over any suitable link, such as terrestrial wireline 459, or via a wireless link that is preferably encrypted. Generally, all intercepted traffic that is transmitted over any link within the communications system is encrypted to ensure the confidentiality, integrity, and/or authentication of the intercepted traffic. The encryption and decryption functions can be implemented as described elsewhere in this description.

Figure 9:
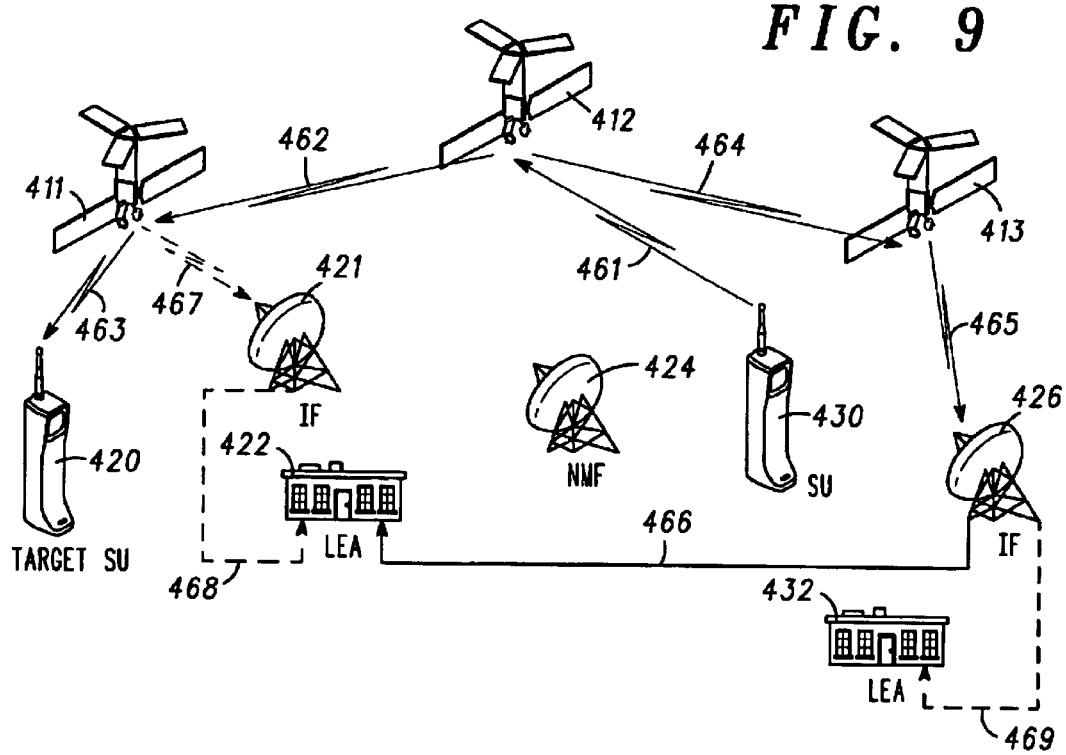
FIG. 9 illustrates a communications intercept when the target SU is the destination of the communications, and wherein the intercepting satellite transmits cloned communications to an LEA via an IF, according to one embodiment of the invention.

FIG. 9 illustrates a communications intercept when the target SU is the destination of the communications, and wherein the intercepting satellite transmits cloned communications to an LEA via an IF, according to one embodiment of the invention.

For example, an SU, such as SU 430, located anywhere in the communications system is originating communications to target SU 420. Satellites 411 and 412, forming part of the communications link from SU 430 to target SU 420, each contain an intercept table identifying target SU 420 as an SU whose communications should be intercepted. So when communications traffic involving target SU 420 moves through satellites 412 and 411, satellites 412 and 411 know to intercept it and to send a cloned copy of it to the IF associated with the LEA that requested the interception.

As shown in FIG. 9, communications traffic between SU 430 and target SU 420 can follow a path that includes links 461, 462, and 463. Either the first satellite receiving traffic intended for target SU 420, i.e. satellite 412, or another satellite in the system through which traffic intended for target SU 420 is moving, i.e. satellite 411, can perform the intercept. In one embodiment, illustrated in FIG. 9, the traffic intended for target SU 420 is intercepted by satellite 412. Satellite 412 clones the communications transmissions occurring between SU 430 and target SU 420. Satellite 412 transmits the original traffic occurring between SU 430 and target SU 420, using links 461 and 462, while satellite 412 concurrently transmits the cloned traffic via link 464 to satellite 413. Satellite 413 transmits the cloned traffic via link 465 to IF 426, as specified by the particular intercept table entry for target SU 420. From IF 426, the cloned traffic is made available to the requesting LEA 422. This can be over any suitable link, such as terrestrial wireline 456, or via a wireless link that is preferably encrypted.

Again, one IF, such as IF 426, can provide intercepted traffic to more than one LEA, so that, for example, IF 426 can send intercepted traffic both over link 466 to LEA 422 and over link 469 to LEA 432.

Figure 10:
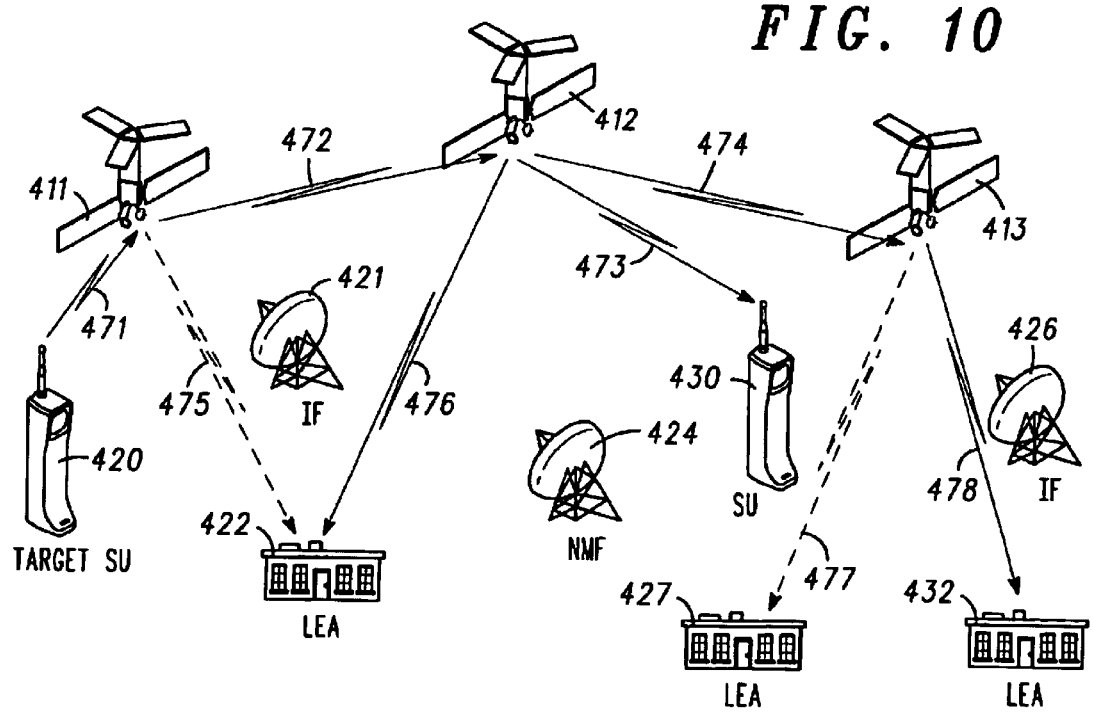
FIG. 10 illustrates a communications intercept when the target SU originates the communications, and wherein the intercepting satellite broadcasts cloned communications directly to one or more LEAs, according to one embodiment of the invention.

In another embodiment, the traffic destined for target SU 420 is intercepted by satellite 411. Satellite 411 transmits the original traffic occurring between SU 430 and target SU 420 via links 462 and 463, while satellite 411 concurrently transmits the cloned traffic via link 467 to IF 421, as specified by the particular intercept table entry for target SU 420. From IF 421, the cloned traffic is made available to a requesting LEA, such as LEA 422. This can be over any suitable link, such as terrestrial wireline 468, or via a wireless link that is preferably encrypted FIG. 10 illustrates a communications intercept when the target SU originates the communications, and wherein the intercepting satellite broadcasts cloned communications directly to one or more LEAs, according to one embodiment of the invention. The intercept scenario depicted in FIG. 10 is similar to that shown earlier in FIG. 8, in that the target SU 420 is the originator of communications with another SU, for example SU 430, anywhere in the communications system. However, in the embodiment depicted in FIG. 10, the intercepting satellite broadcasts the cloned traffic directly to the requesting LEA(s) rather than sending the cloned traffic to an IF for distribution to one or more LEAs associated with the IF.

Thus, for example, in FIG. 10 original traffic is sent from target SU 420 to SU 430 via link 471, satellite 411, ink 472, satellite 412, and link 473. Intercept can be performed in any satellite.

In one embodiment, satellite 412 intercepts the traffic originating film target SU 420, clones it, and transmits it directly to LEA 486. If authorized LEA 432 has also requested an intercept of this traffic, satellite 412 sends cloned traffic via link 474 to satellite 413, which transmits it directly to LEA 432 over link 478. Satellite 413 can optionally also directly broadcast the cloned traffic to other requesting LEAs that are covered by its broadcast antenna beam pattern. For example, satellite 413 can broadcast cloned traffic via link 477 directly to LEA 427.

In another embodiment, satellite 411 also performs intercept on traffic originating from target SU 420, and it sends cloned traffic via link 475 directly to requesting LEA 422. In this embodiment, satellite 412 would only transmit cloned traffic to LEA 422 if LEA 422 was not able for some reason to receive it from satellite 411.

FIG. 11 illustrates a communications intercept when the target SU is the destination of the communications, and wherein the intercepting satellite broadcasts to cloned communications directly to one or more LEAs, according to one embodiment of the invention.

The intercept scenario depicted in FIG. 10 is similar to that shown earlier in FIG. 9, in that the target SU 420 is the recipient of communications from another SU, for example SU 430, anywhere in the communications system. However, in the embodiment depicted in FIG. 11, the intercepting satellite broadcasts the cloned traffic directly to the requesting LEA(s) rather than sending the cloned traffic to an IF for distribution to one or more LEAs associated with the IF.

Thus, for example, in FIG. 11, original traffic is sent from SU 430 to target SU 420 via link 481, satellite 412, link 482, satellite 411, and link 483. Intercept can be performed in any satellite.

In one embodiment, satellite 412 intercepts the traffic originating from SU 430, clones it, and transmits it via link 486 directly to LEA 422. If authorized LEA 432 has also requested an intercept of this traffic, satellite 412 sends cloned traffic via link 484 to satellite 413, which transmits it directly to LEA 432 over link 488. Satellite 413 can optionally also directly broadcast the cloned traffic to other requesting LEAs that are covered by its broadcast antenna beam pattern. For example, satellite 413 can broadcast cloned traffic via link 487 directly to LEA 427.

In another embodiment, satellite 411 also performs intercept on traffic destined for target SU 420 via link 483, and it sends cloned traffic via link 485 directly to requesting LEA 422. In this embodiment, satellite 412 would only transmit cloned traffic to LEA 422 if LEA 422 was not able for some reason to receive it from satellite 411.

FIG. 12 illustrates an intercept table 500 that is maintained in one or more satellites, according to one embodiment of the invention. In FIG. 6, described earlier, intercept tables were described as being updated in one or more satellite nodes from a suitable terrestrial station, such as NMF 424. In one embodiment, each satellite node contains an identical intercept table stored in its on-board memory 86 (FIG. 5), but in other embodiments the intercept tables can contain different information.

Intercept table 500 comprises a list of all active intercept orders 501–504 within the communications system. Each order 501–504 within the table comprises a plurality of different information fields, including an Intercept Order No. field, a Target SU ID field, a Requesting IF field containing one or more IDs corresponding to one or more requesting IFs, a Start Intercept field specifying when to start the intercept, a Stop Intercept field specifying when to stop the intercept, a Data field, a Header field, an IF field, and an LEA field containing one or more IDs corresponding to one or more requesting LEAs. Additional fields can be provided as necessary.

When a requesting LEA (e.g. LEA 422, FIG. 6) issues an intercept request to NMF 424, NMF 424 generates an intercept order that is sent to one or more, satellites for insertion into the on-board intercept table 500. Concurrently, NMF 424 generates an intercept order parameter notification to one or more IFs that are associated with, the requesting LEA for insertion into an intercept order parameter table at the one or more IFs. The intercept order parameter table is discussed regarding FIG. 13 below.

Each field in the intercept table 500 will now be discussed. The Intercept Order No. field contains an order number 00001–NNNNN that is generated by NMF 424. The Intercept Order No. can be unique within the system. The Target SU ID is the unique SU identity number that is assigned to each SU upon initiation of service. Each SU within the system has assigned to it a unique SU ID. The Requesting IF field contains a unique ID number that is assigned to each IF within the system.

The Start Intercept and Stop Intercept fields contain time data specifying when a particular intercept is to start and stop, respectively. The entries into these fields are determined from the authorizing documents that support an LEA's intercept request, such as a court order that identifies a target SU whose communications traffic is to be monitored, along with the dates and times when such intercept is to be started and stopped. According to one embodiment, as described above, when such an intercept order request is received from an LEA by an NMF, the NMF generates and sends an intercept order to one or more satellite nodes in the communications system.

The precision of the start and stop data can be identical in the NMF and satellite nodes, or it can be different. For example, in one embodiment, the Start Intercept and Stop Intercept fields comprise a 32-bit number that is compared by a suitable on-board process to the 32-bit output of a time counter on the satellite. Every node within the system includes a time counter, and the time counters are synchronized to a master time counter. In another embodiment, each satellite node and other system node includes a clock that is synchronized to Greenwich Mean Time (GMT) or to another universally available time standard, such as a Global Positioning System (GPS) clock. In another embodiment, the precision of the start and stop data is different in the NMF and satellite nodes. The degree of time granularity of the start and stop data in the terrestrial-based nodes, e.g. the NMF and/or IF(s), can be different from that in the satellite nodes. The start and stop data can be of coarse granularity within the satellite nodes, e.g. to within 6, 12, 24 hours, one day, two days, etc., while that in the NMF and/or IF(s) can be of fine granularity, e.g. to within the nearest minute or second, reflecting exact start and stop times specified in a permit obtained by an LEA from an authorizing agency such as a court. For example, an intercept order can be sent to the satellite node(s) ordering intercept to begin, e.g., immediately, or within a specified number of hours, or within a specified number of days. Intercepting satellites begin sending cloned communications immediately or at the grossly specified time, and the IFs begin receiving them, but the IFs do not transmit the cloned communications to the requesting LEA(s) until the exact time specified in the intercept order parameter table stored in the IF. The IF discards cloned communications received before the Start Intercept time or after the Stop Intercept time.

Alternatively, the granularity difference could be the opposite, so that the start and stop data in the NMF could be of coarse granularity, and that in the satellites could be of fine granularity.

The Data field and Header field can be implemented as 1-bit fields that indicate whether data traffic, header information, or both, are to be intercepted. A "1" in the Data and/or Header fields indicates that either or both of the corresponding information should be intercepted by the satellite. In another embodiment, either or both of the Data field and Header field can be eliminated if, for example, it is always desired to provide or not provide one or the other types of information.

The LEA field specifies a unique identity number of the LEA to which intercepted communications resulting from a particular intercept order should be sent. If more than one LEA is associated with one IF, additional LEA fields can be provided.

FIG. 13 illustrates an intercept order parameter table 600 that is maintained in one or more IFs, according to one embodiment of the invention. Intercept order parameter table 600 includes the intercept order entries from intercept table 500 (FIG. 12) that pertain only to one IF. For example, intercept orders 601 and 602 in intercept in a order parameter table 600 are similar or identical to intercept orders 501 and 502 in intercept table 500. In another embodiment, the intercept order parameter table 600 does not include the Requesting IF field, since all intercept orders stored in the intercept order parameter table 600 pertain to just one IF. In another embodiment, the intercept order parameter table 600 does not include the LEA field, in the event that only one LEA is associated with this IF or with every IF in the system.

An intercept order parameter table 600 can be maintained in IFs for embodiments wherein cloned communications are transmitted to LEAs via IFs. For embodiments wherein cloned communications are transmitted directly from an intercepting satellite node to LEAs, an intercept order parameter table 600 can be maintained in the LEAs rather than or in addition to being maintained in the IFs. The intercept order parameter table 600 stored in the LEAs would be suitably modified to contain only the relevant fields pertaining to the particular system architecture used to implement the invention. The intercept order parameter table 600 stored in the LEAs would be filled and updated from intercept orders transmitted to the LEA by whatever entity, e.g. an NMF or an IF, generated the intercept orders.

Figure 14:
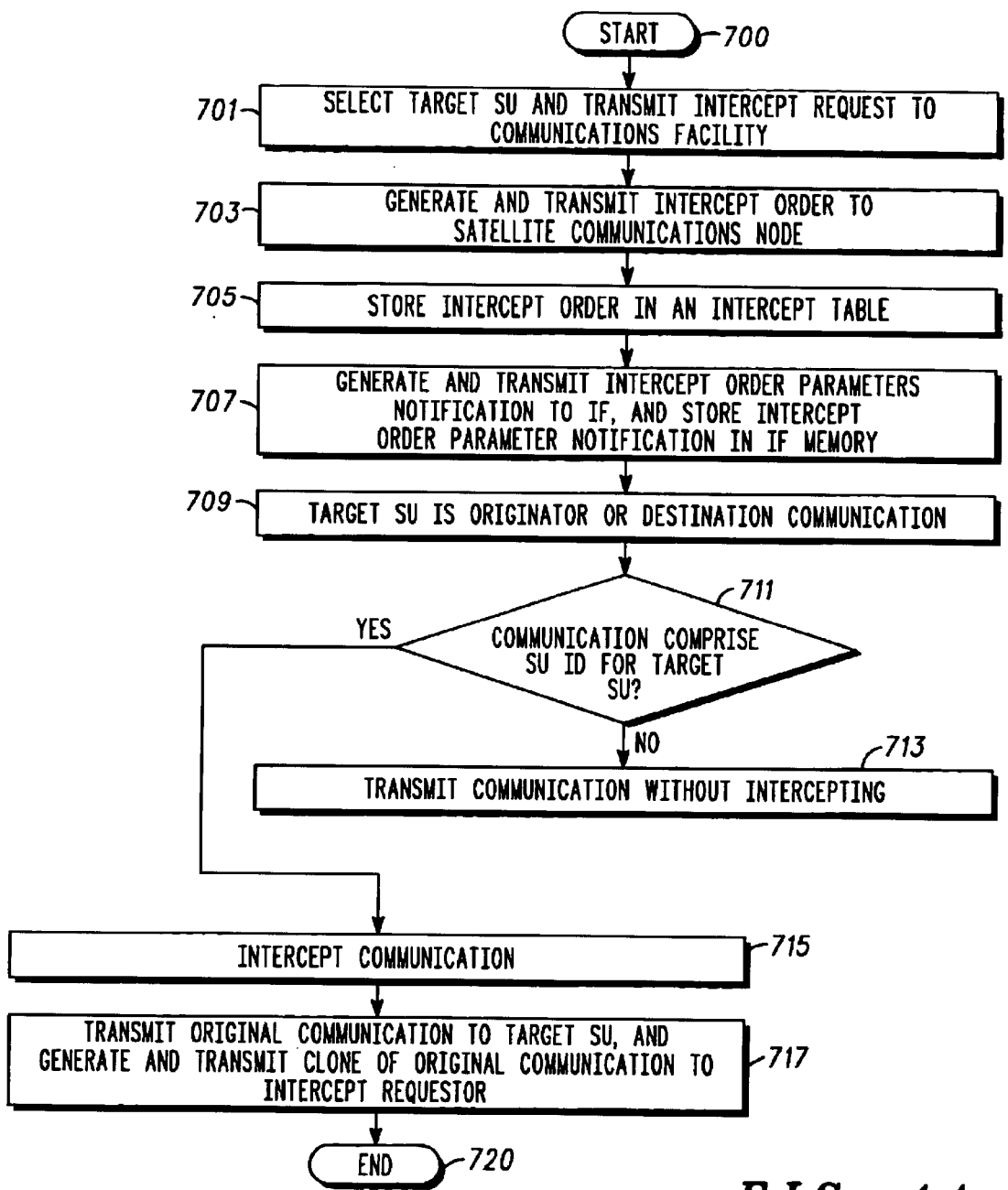
FIG. 14 shows a flow chart for methods of operating a communications system wherein authorized intercept can be performed in a satellite communications node, according to one embodiment of the invention.

FIG. 14 shows a flow chart for methods of operating a communications system wherein authorized intercept can be performed in a satellite communications node, according to one embodiment of the invention.

Referring to FIG. 14, the method starts in block 700. In 701, an intercept requester, such as an LEA or any other entity requesting an intercept to be performed, selects a target SU and transmits an intercept request to a communications facility, such as an NMF. The communications facility could be an IF, according to another embodiment. The communications facility need not be limited to terrestrial facilities. The terms "communications facility", "communications system node", and "network node" as used herein are not limited to any particular type of communications entity and comprise satellites and/or earth stations.

In 703, the NMF (or other communications facility that received the intercept request) generates and transmits an intercept order to at least one satellite communications node. In one embodiment, the intercept order is transmitted to all satellites in the communications system.

In 705, the satellite communications node stores the intercept order into an intercept table in its on-board memory. As shown in FIG. 12, the intercept table can comprise all intercept orders within the communications system. Each intercept order includes an ID for a target SU, an ID for at least one IF, an ID for at least one intercept requester, a start intercept time (when the satellite communications node is to start evaluating communications regarding this particular target SU), a stop intercept time (when the satellite communications node is to stop evaluating communications regarding this particular target SU), a data field, and a header field. Each intercept order can also include an order number.

In 707, the NMF generates and transmits an intercept order parameter notification to an IF that is associated with the intercept requester requesting this particular intercept, and the IF stores the intercept order parameter notification in its memory. In one embodiment, the intercept order parameter notification is stored in an intercept order parameter table within the IF's memory. This table can be like that shown in FIG. 13.

In 709, the target SU subsequently is either the originator or the destination of a communication within the communications system that reaches a satellite communications node that is storing an order intercept table.

In 711, the satellite communications node evaluates a communication passing through the node. More specifically, the processing element of the satellite communications node executes at least one computer program stored in the memory of its on-board data processing system, whenever a communication is received by the satellite's transceiver. The satellite's transceiver normally receives a communication from one communications node in the system and transmits the communication to another communications node. If, as a result of the at least one computer program being executed, it is determined that a particular communication, or the some header or other control information associated with the communication, comprises the SU ID for the target SU, then the method goes to 715, wherein the satellite communications node merely transmits the communication without intercepting it; otherwise, it goes to 715.

In 715, the satellite communications node intercepts the communication. In 717, the satellite communications node transmits the original communication to the target SU. The satellite communications node also generates a clone of the original communication and transmits the communication clone to the intercept requestor, either directly (as illustrated, for example, in FIG. 10 or 11) or via the NMF or an IF (the latter case being illustrated, for example in FIG. 8 or 9). As mentioned earlier, the functions of the system's terrestrial communications nodes, such as an NMF, an IF, an NOF, or an AMF, could be combined at any desired hierarchical level. Thus, an intercept in the form of a communication clone can be directed by a satellite communications node to any suitable communications node within the system.

The method ends in 720.

It will be understood by those skilled in the art that the operations of the methods shown and described herein can be carried out in a different order than those described with reference to FIG. 14. It will also be understood that while the flowchart has "Start" and "End" blocks, in general the method that it depicts is continuously performed.

Thus, there have been described above systems and methods for performing communications intercepts within satellite nodes of a communications system in order to intercept communications that may not be passing through any terrestrial node of the communications system. The intercepts are performed in a manner that is unobtrusive to a target subscriber unit. The ordering and carrying out of intercepts can be performed in a secure, encrypted manner, so that entities of the communications system that do not have an authorized right of intercept cannot activate, deactivate, modify, or participate in intercepts.

The systems and methods are quite versatile and can be implemented in any type of satellite-based communications system. As described herein, the advantages of the present invention will be apparent to those of skill in the art and will provide improved systems and methods for controlling communications intercepts within a satellite-based communications system.

While the invention has been described in terms of specific examples, it is evident that many alternatives and variations will be apparent to those skilled in the art based on the description herein, and it is intended to include such variations and alternatives in the claims. For example, while various functions of the present invention have been described as being implemented with one or more data processing systems executing computer programs, such functions could also be implemented with suitable logic circuitry and/or computer firmware. These and other changes and modifications are intended to be included within the scope of the present invention.

What is claimed is:

1. A method of performing communication intercepts in a communications system comprising at least one satellite communications node and a plurality of subscriber units, the method comprising:

maintaining a database of subscriber unit identifiers and jurisdictional information associated with each of the plurality of subscriber units;

selecting one of the plurality of subscriber units as a target subscriber unit;

identifying the at least one satellite communications node associated with the jurisdictional information associated with the target subscriber unit;

transmitting an intercept order comprising the identifier for the target subscriber unit to the identified at least one satellite communications node providing service to the target subscriber unit; and receiving an intercepted communication with the target subscriber unit from the at least one satellite communications node.

2. The method recited in claim 1 wherein the communications system further comprises a network management facility.

3. The method recited in claim 2 wherein the at least one communications node comprises a memory, the method further comprising:

the at least one satellite communications node storing the intercept order into an intercept table in the memory.

4. The method recited in claim 3 wherein in the selecting operation more than one of the plurality of subscriber units is selected as a target subscriber unit, wherein the selecting operation is performed by at least one intercept requestor having an intercept requestor ID, and wherein the intercept table comprises a list of all target subscriber units within the footprint of the at least one satellite communications node, each target subscriber unit having associated therewith at least one intercept requestor ID.

5. The method recited in claim 2 wherein the identifier comprises an encrypted subscriber unit ID corresponding to the target subscriber unit.

6. The method recited in claim 5 and further comprising:

the at least one satellite communications node determining whether a received communication comprises the subscriber unit ID for the target subscriber unit;

intercepting the communication when said at least one satellite communications node determines said communication comprises said subscriber unit ID; and transmitting without intercepting the communication when said at least one satellite communications node determines said communication does not comprise said subscriber unit ID.

7. The method recited in claim 6 wherein the communications system further comprises a network intercept facility, and wherein the intercept order comprises a network intercept facility ID identifying the network intercept facility, the method further comprising:

if the at least one satellite communications node intercepts the communication, transmitting the communication to the network intercept facility.

8. The method recited in claim 2 wherein the communications system further comprises a network intercept facility, and wherein the intercept order comprises a network intercept facility ID identifying the network intercept facility, the method further comprising:

the at least one satellite communications node transmitting the communication to the network intercept facility.

9. The method recited in claim 8 wherein the intercept order identifies an intercept requestor, the method further comprising:

the network intercept facility addressing a transmission of the intercepted communication to the intercept requestor.

10. The method recited in claim 8 wherein the intercept order identifies an intercept requestor, the method further comprising:

the network intercept facility providing a transmission of the intercepted communication to the intercept requestor.

11. A satellite communications node for use in a communications system having a plurality of communications nodes, the satellite communications node comprising:

a transceiver to receive communications from one communications node and to transmit communications to another communications node;

a data processing system, including a processing element and a memory, to execute at least one computer program performing intercepts in the communications system, the at least one computer program when executed comprising the operations of:

receiving an intercept order from a network intercept facility, the intercept order comprising a target communications node ID assigned by a network operations facility;

decrypting the intercept order to thereby verify the network intercept facility;

separately decrypting the target communications node ID to the thereby verify the network operations facility;

evaluating a communication received by the transceiver to determine whether it comprises the target communications node ID;

if so, intercepting the communication; and if not, controlling the transceiver to transmit the communication without intercepting it.

12. The satellite communications node recited in claim 11 wherein the intercept order is stored in an intercept table in the memory.

13. The satellite communications node is recited in claim 11 wherein the intercept order further comprises a start time when evaluating is to start, and wherein evaluating starts at the same time.

14. The satellite communications node is recited in claim 11 wherein the intercept order further comprises a stop time when evaluating is to stop, and wherein evaluating stops at the stop time.

15. The satellite communications node recited in claim 11 wherein at least one computer program when executed comprises the additional operations of:

if the communication is intercepted, generating a communication clone; and controlling the transceiver to transmit the communication clone to another of the communications nodes.

16. The satellite communications node recited in claim 15 wherein the intercept order further comprises an ID corresponding to the network intercept facility to which a communication clone is to be transmitted, and wherein the transceiver is controlled to transmit the communication clone to the network intercept facility.

17. The satellite communications node recited in claim 16 wherein the intercept order further comprises a start time when evaluating is to start, wherein evaluating starts at the start time, and wherein the start time has a different granularity than a start time stored at the network intercept facility corresponding to the intercept order.

18. The satellite communications node recited in claim 16 wherein the intercept order further comprises a start time when evaluating is to start, wherein evaluating starts at the start time, and wherein the start time has a different granularity than a stop time stored at the network intercept facility corresponding to the intercept order.

19. The satellite communications node recited in claim 15 wherein the intercept order further comprises an ID corresponding to an intercept requestor to which a communication clone is to be transmitted, and wherein the transceiver is controlled to transmit the communication clone to the intercept requestor.

20. A communications facility for use in a communications system comprising a plurality of communications nodes, including a plurality of subscriber nodes and at least one satellite communications node in which communications are intercepted, the communications facility comprising:

a transceiver to receive communications from one communications node and to transmit communications to another communications node;

a data processing system, including a processing element and a memory, the processing element executing at least one computer program stored in the memory, the at least one computer program when executed comprising the operations of:

receiving an encrypted identifier for a target node of the plurality of subscriber nodes from a database associated with a network operations facility responsible for a jurisdiction served by the communications system in which the target node is located;

forming an intercept order comprising the encrypted identifier, wherein the intercept order is encrypted with a key that identifies the communications facility; and transmitting the intercept order to the at least one satellite communications node providing service to the jurisdiction in which the target node is located.

* * * * *